United States Patent [19]

Pierce et al.

[11] 4,203,667

[45] May 20, 1980

[54] COVERT RECOVERY OR SIGNALLING SYSTEM

[75] Inventors: Russell W. Pierce, Bremerton, Wash.; Edward A. Teppo; Henry P. Leet, both of Ridgecrest, Calif.

[73] Assignee: The United States of America as represented by the Secretary of the Navy, Washington, D.C.

[21] Appl. No.: 965,760

[22] Filed: Dec. 4, 1978

[51] Int. Cl.² .................. G01B 11/26; H04B 9/00
[52] U.S. Cl. ..................... 356/152; 362/112; 362/113; 362/114; 455/604; 455/609; 455/617
[58] Field of Search ............ 250/199; 356/152; 340/366 F; 362/112–114; 455/609, 617, 604

[56] References Cited

U.S. PATENT DOCUMENTS

| | | | |
|---|---|---|---|
| 3,907,435 | 9/1975 | Roodvoets | 356/152 |
| 3,989,942 | 11/1976 | Waddoups | 356/152 |
| 4,099,050 | 7/1978 | Sauermann | 250/199 |
| 4,131,791 | 12/1978 | Lego, Jr. | 250/199 |
| 4,150,824 | 4/1979 | Villa | 250/199 |

OTHER PUBLICATIONS

Kruse et al., *Electronics*, 10 Mar. 1961, pp. 177–181.

Primary Examiner—S. C. Buczinski
Attorney, Agent, or Firm—R. S. Sciascia; W. Thom Skeer; Kenneth G. Pritchard

[57] ABSTRACT

A signalling system for downed aircrew recovery. The system uses an infrared laser beam aimed at a search aircraft which has a detector and a position indicator to locate the transmitter so that the downed crew may be rescued.

3 Claims, 9 Drawing Figures

- 9 SINGLE DETECTORS
- 20° FOV EACH
- 1 QUAD DETECTOR
- 90° FOV

COVERT RECOVERY OR SIGNALLING SYSTEM

BACKGROUND OF THE INVENTION

1. Field of the Invention

This invention relates to electromagnetic radiation. More specifically, this invention relates to infrared signalling systems. By way of further characterization, the invention pertains to infrared signalling systems for locating an infrared transmitter on the ground.

2. Description of the Prior Art

Military air rescue operations have, in the past, been hampered by the lack of a covert means of indicating the location of the downed aircrew. The equipment currently used, a radio transmitter for general location determination and either a visible light or a smoke dispenser for precise location determination, could reveal the location to anyone in the area and could compromise the location of hostile forces. Consequently, these devices are not favored by aircrews.

SUMMARY OF THE INVENTION

The present invention provides a covert recovery or signalling system. A downed pilot has an infrared laser transmitter configured for hand-held use attached to his flight suit. The beam from the transmitter is aimed at the search aircraft. A search aircraft having a quadrant detector receiving unit and a position indicator on board searches the vicinity of the downed aircrew at an altitude of up to approximately 10,000 feet and determines the location of the downed crew to within a few hundred feet. A helicopter having a similar receiver on board flies directly to the downed crew, thus reducing search time and vulnerability to ground fire.

DESCRIPTION OF THE PREFERRED EMBODIMENT

Figure 1:
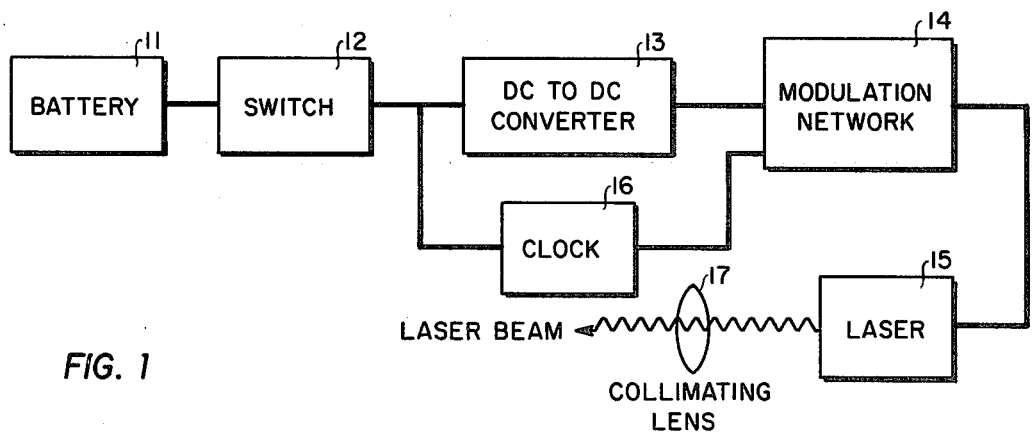
FIG. 1 is a functional block diagram of the transmitter.

FIG. 1 illustrates the essential features of the transmitter. A 5–10 volt battery 11 is connected to a trigger switch 12. When trigger switch 12 is closed, battery 11 drives a DC to DC converter 13, which charges a modulation network 14. A source of coherent electromagnetic radiation, which may be a GaAs laser diode 15, or a $CO_2$ waveguide laser, is driven by modulation network 14. A clock circuit 16 connected between switch 12 and modulation network 14 causes the energy stored in modulation network 14 to discharge through laser diode 15 at a predetermined pulse repetition frequency or in a coded sequence of pulses. A collimating lens 17 collects the laser emission and narrows the beam spread to about 5°.

Figure 2:
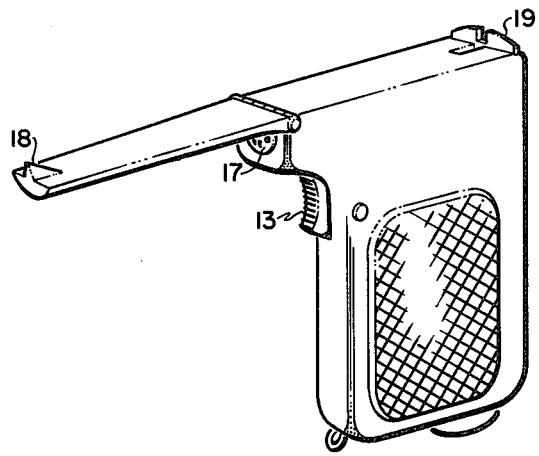
FIG. 2 is a perspective view of the transmitter unit configured for hand-held use.

FIG. 2 shows an embodiment of the invention configured for hand-held use. When the output beam from collimating lens 17 is about 5° or less, it is possible to use sights 18 and 19 to aim the beam at a rescue aircraft or other object. The mount for sight 18 is foldable to make the device more compact when not in use. Trigger switch 13 is configured to be operable by a person wearing a glove.

Figure 3:
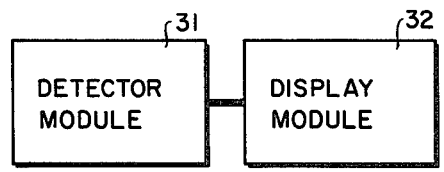
FIG. 3 is a functional block diagram of the receiver.

Referring to FIG. 3, the receiver comprises a fixed field of view detector 31 module for short range applications, such as in a helicopter, and a display module 32.

Figure 4:
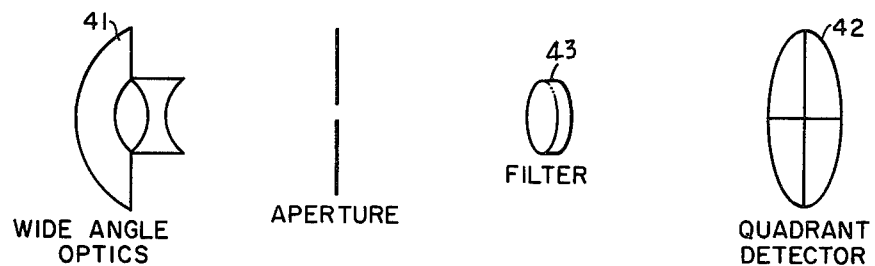
FIG. 4 illustrates the receiver optical system and quadrant detector.

Referring to FIG. 4, a signal from the transmitter is passed through a wide angle optical system 41, which could be an f/1.8, 3.5 mm focal length lens, and is focused onto a quadrant detector 42, which may be a silicon detector when a GaAs laser diode is the source of coherent electromagnetic radiation. The largest available quadrant detector, having a 10 mm diagonal, combined with the hereinabove described lens would result in a field of view of about 160°. A filter 43 can be placed in front of quadrant detector 42 to limit the light detected to the particular frequency emitted by the transmitter.

Figure 5:
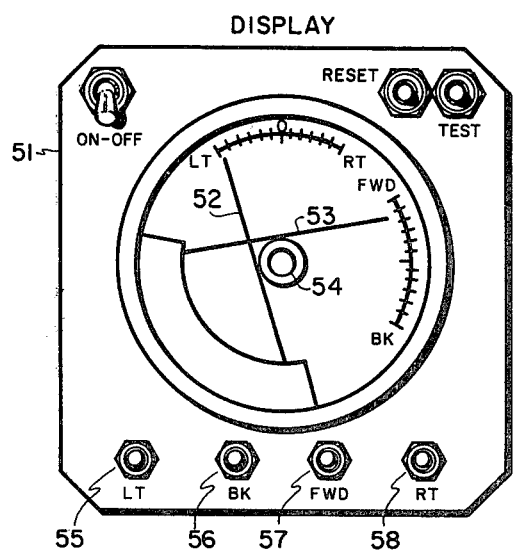
FIG. 5 illustrates the display of a position indicator meter configured for use with a quadrant detector suitable for short range applications.

The display module utilizes the target designator system target position indicator meter that is used with certain laser guided weapons. The display 51 of this meter is illustrated in FIG. 5. This meter provides transmitter location information relative to the aircraft heading. When the indicator needles 52 and 53 cross over the center of small circle 54, the aircraft is directly above the transmitter. The display module has four indicator lights 55, 56, 57, 58, each corresponding to a quadrant of the detector to indicate if a signal is received in a particular quadrant.

Figure 6:
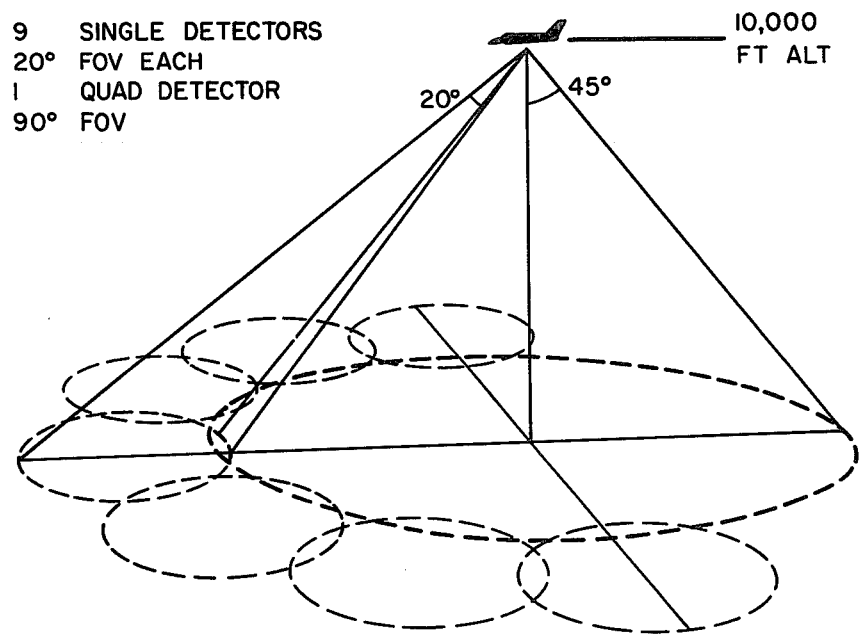
FIG. 6 shows overlapping fields of view for detectors for long range applications.
Figure 9:
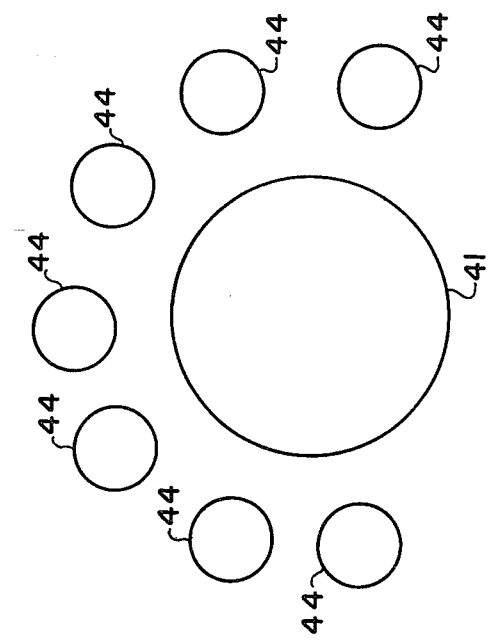
FIG. 9 is a different view of the plural lens system of FIG. 8.
Figure 8:
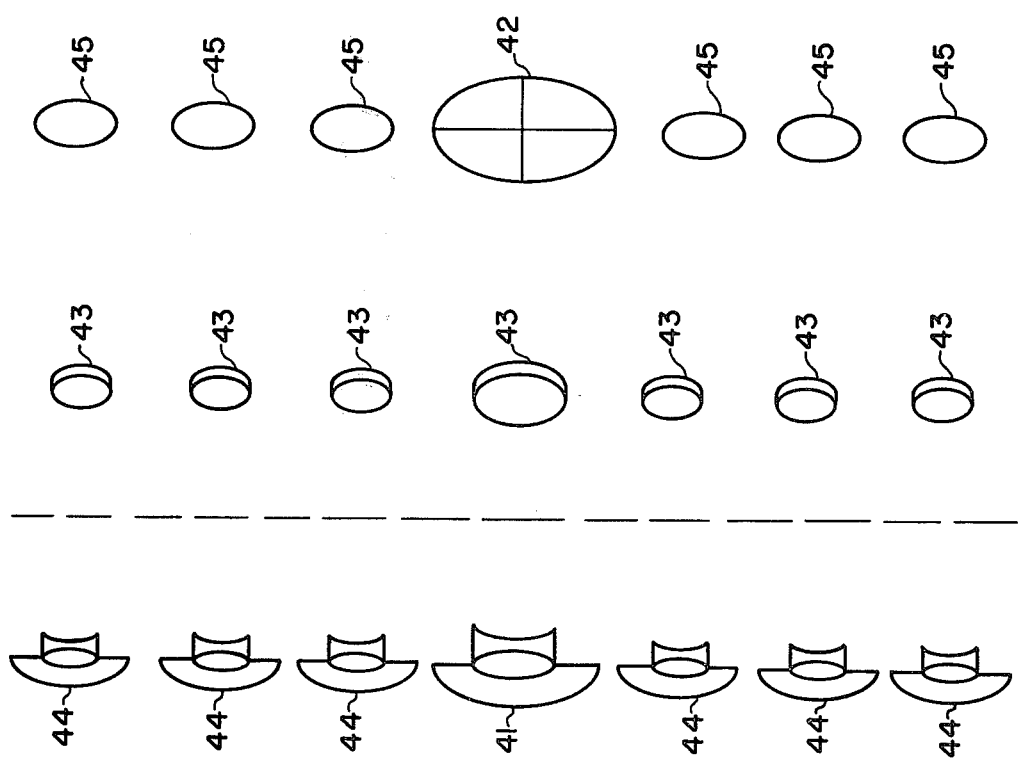
FIG. 8 shows a side view of the plural lens system used in FIG. 6.

A single wide angle detector would be insufficient for long range applications, such as in a search aircraft flying at an altitude of about 10,000 feet. Therefore, the search aircraft detector module has a quadrant detector looking directly below the aircraft and a cluster of other detectors, each with its own f/1 optics, configured to have overlapping fields of view as shown in FIG. 6. Each of these detectors is similar to the receiver optical system shown in FIG. 4. A side view of such an arrangement is shown in FIG. 8. A detector 45 is used in place of quadrant detector 42 to determine if a signal is present. Detector 45 can be a silicon sensor. Less demanding wide angle optics 44 are used for the surrounding cluster since a smaller area is considered by each of the surrounding lens-detector arrangements. FIG. 9 shows the same system as FIG. 8 but from a head-on view.

Sunlit backgrounds interfere with a silicon sensor when the field of view aperture product is greater than about 1 cm². sr, which limits the field of view at f/1 to about 20°. Therefore, nine such detectors and a quadrant detector having a 90° field of view are used to search the area shown in FIG. 6.

Figure 7:
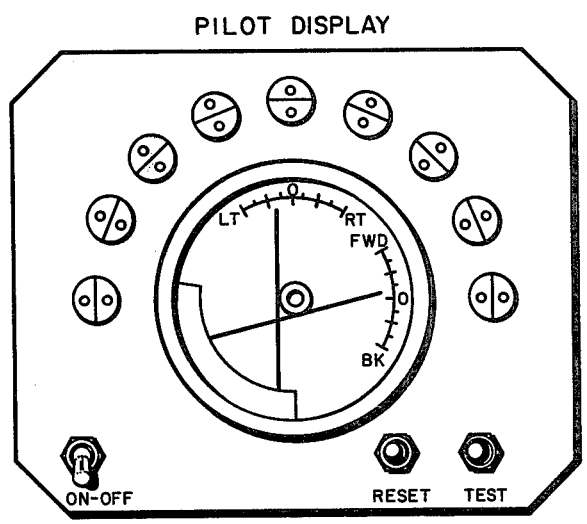
FIG. 7 illustrates the display of a position indicator meter configured for use in long range applications with a quadrant detector and a plurality of other detectors.

The quadrant detector is connected to a Target Position indicator and each of the other detectors is connected to two corresponding indicator lights. The display is illustrated in FIG. 7. One light indicates if a signal was ever detected by a particular detector; and, if so, remains on. The other light indicates if a signal is being detected by blinking on and off.

A downed pilot uses the signalling system by aiming the transmitter laser beam at the search aircraft, and the receiver on the search aircraft determines the pilot's position to within a few hundred feet. The rescue helicopter is directed to the vicinity of the transmitter; and by monitoring his display panel, the helicopter pilot flies directly to the downed pilot. The signalling system permits the downed pilot to remain concealed and reduces search time, thereby enhancing his probability of being rescued.

The present invention has broad applications as a signalling system. It may be used in any application where there is a direct line of sight between the transmitter and receiver.

The foregoing description and the appended claims constitute disclosure sufficient to enable a person skilled in the optics and infrared arts having the benefit of the teachings contained herein to make and use the invention. The structure herein described overcomes the disadvantages of the prior art and constitutes a meritorious advance in the art unobvious to one of ordinary skill in the art not having the benefit of these teachings.

What is claimed is:

1. A location signalling apparatus comprising:
   a source of electromagnetic radiation emitted along an optical axis;
   a means for modulating said source of electromagnetic radiation so that said radiation is emitted with a predetermined pattern;
   a means for detecting said emitted radiation whenever said detector means lies along said optical axis comprising:
   a central lens system with a plurality of lenses, each lens focusing light from a predetermined area along an optical axis for the lens receiving said emitted radiation, said lenses arranged to have one lens define a large central area that is observed and the remaining lenses define a plurality of smaller overlapping areas covering at least half the perimeter of said central area in a predetermined fashion;
   a quadrant detector situated on the lens axis of the lens defining said central area for detecting said emitted radiation when said source is within a quadrant of said central area;
   a plurality of detectors placed with at least one detector for receiving said emitted radiation from each of said lenses observing said smaller predetermined area if said source of emitted radiation is in one of them; and
   a position indicator means connected to said detector means for identifying which of said detectors is observing said source, if any, and if said source is being observed by said quadrant detector, where within said central area said source is located.

2. A location signalling apparatus as described in claim 1 wherein said source of electromagnetic radiation comprises an infrared laser having a characteristic frequency.

3. A location signalling apparatus as described in claim 2 wherein said detecting means further comprises a filter in front of each detector including the quadrant detector for limiting observed radiation to said characteristic frequency.

* * * * *